Patented Jan. 12, 1932

1,840,398

UNITED STATES PATENT OFFICE

HANS KRZIKALLA, OF MANNHEIM, GERMANY, ASSIGNOR TO GENERAL ANILINE WORKS, INC., OF NEW YORK, N. Y., A CORPORATION OF DELAWARE

CHROMIFEROUS AZO DYESTUFFS

No Drawing. Application filed November 10, 1930, Serial No. 494,809, and in Germany November 18, 1929.

The present invention relates to complex chromium compounds of azo dyestuffs particularly suitable for dyeing leather.

I have found that the complex chromium compounds of azo dyestuffs corresponding to the formula:

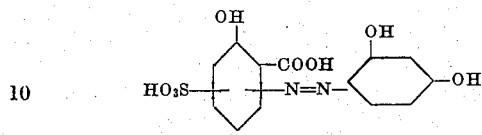

are valuable dyestuffs for dyeing leather. The said chromiferous dyestuffs are obtained by treating the azo dyestuffs obtainable from diazotized amino-sulphosalicylic acids and resorcinol with compounds of trivalent chromium. The chroming of the dyestuffs may be carried out for example by heating them on the water-bath or by boiling them under a reflux condenser with solutions of chromic formate acetate, fluoride or the like. The resulting chromium compounds of the dyestuffs yield especially on leather beautiful, full, uniform brown or red dyeings which have a very good fastness to light.

The following example will further illustrate the nature of this invention, but the invention is not restricted thereto. The parts are by weight.

Example 35 parts of the azo dyestuff from diazotized para-amino-sulphosalicylic acid (OH: COOH: NH$_2$: SO$_3$H=1:2:4:6) and resorcinol are heated for from about 1 to 2 hours to from 80° to 100° C. with 500 parts of water, about 43 parts of a chromium oxide hydrate paste containing about 24 per cent of Cr$_2$O$_3$ and 20 parts of 85 per cent formic acid. The dyestuff which is the complex chromium compound of the azo dyestuff of the formula:

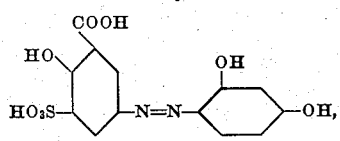

is then isolated by evaporating the solution or by salting out. A brownish powder is obtained which dissolves in concentrated sulphuric acid giving an orange coloration and yields a uniform, especially full, beautiful brown dyeing having a very good fastness to light on leather.

On chroming the azo dyestuff from diazotized ortho-amino-sulphosalicylic acid (OH: COOH: NH$_2$: SO$_3$H=1:2:6:4) and resorcinol which corresponds to the formula:

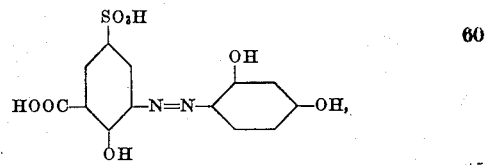

in the manner described a dyestuff is obtained dyeing leather fast, full and red shades.

What I claim is:—

1. As new articles of manufacture the complex chromium compounds of azo dyestuffs corresponding to the formula:

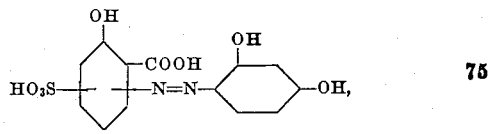

the said chromiferous dyestuffs yielding uniform brown or red dyeings on leather.

2. As a new article of manufacture the complex chromium compound of the azo dyestuff corresponding to the formula:

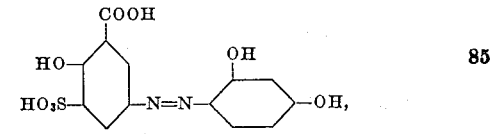

the said chromiferous dyestuff dissolving in concentrated sulphuric acid giving an orange coloration and yielding a uniform brown dyeing on leather.

In testimony whereof I have hereunto set my hand.

HANS KRZIKALLA.